US010631700B2

United States Patent
Kim et al.

(10) Patent No.: US 10,631,700 B2
(45) Date of Patent: Apr. 28, 2020

(54) MOTOR DRIVING APPARATUS AND HOME APPLIANCE COMPRISING SAME

(71) Applicants: LG Electronics Inc., Seoul (KR); Seoul National University R&DB Foundation, Seoul (KR)

(72) Inventors: Jongwon Kim, Seoul (KR); Jungdae Lee, Seoul (KR); Myungkeun Yoo, Seoul (KR); Junho Ahn, Seoul (KR); Jungik Ha, Seoul (KR); Sungho Jung, Busan (KR); Jaeyong Park, Chungcheongbuk-do (KR)

(73) Assignee: LG Electronics Inc. and Seoul National University R&DB Foundation, Seoul (KR)

( * ) Notice: Subject to any disclaimer, the term of this patent is extended or adjusted under 35 U.S.C. 154(b) by 0 days.

(21) Appl. No.: 15/766,701

(22) PCT Filed: Oct. 7, 2016

(86) PCT No.: PCT/KR2016/011250
§ 371 (c)(1),
(2) Date: Apr. 6, 2018

(87) PCT Pub. No.: WO2017/061817
PCT Pub. Date: Apr. 13, 2017

(65) Prior Publication Data
US 2018/0289229 A1    Oct. 11, 2018

(30) Foreign Application Priority Data

Oct. 7, 2015  (KR) .................. 10-2015-0140813

(51) Int. Cl.
*A47L 9/28*        (2006.01)
*H02P 21/18*       (2016.01)
(Continued)

(52) U.S. Cl.
CPC .............. *A47L 9/2842* (2013.01); *A47L 9/28* (2013.01); *A47L 9/2857* (2013.01);
(Continued)

(58) Field of Classification Search
CPC ........ H02P 1/30; H02P 23/00; H02P 23/0077; A47L 9/2842
See application file for complete search history.

(56) References Cited

U.S. PATENT DOCUMENTS

| 4,902,944 | A  | * | 2/1990 | Daggett | ................ B25J 13/088 |
|           |    |   |        |         | 318/563                      |
| 2006/0049795 | A1 | * | 3/2006 | Iura    | ........................ H02P 1/029 |
|           |    |   |        |         | 318/807                      |

(Continued)

FOREIGN PATENT DOCUMENTS

| JP | 2000350490 A | * | 12/2000 |
| JP | 2003204691   |   | 7/2003  |

(Continued)

OTHER PUBLICATIONS

Extended European Search Report in European Application No. 16853933.6, dated Apr. 23, 2019, 9 pages.

*Primary Examiner* — Cortez M Cook
(74) *Attorney, Agent, or Firm* — Fish & Richardson P.C.

(57) ABSTRACT

The present invention relates to a motor driving apparatus and a home appliance comprising the same. The motor driving apparatus according to an embodiment of the present invention comprises: an inverter which converts a direct current power source of a DC stage capacitor to an alternating current power source and outputs the converted alternating power source to a motor by a switching operation; a DC stage resistance device arranged between the DC stage capacitor and the inverter; and a control unit which controls the inverter on the basis of phase current sampled by means of the DC stage resistance device, wherein the
(Continued)

control unit controls the frequency of voltage applied to the motor or the rotation frequency of the motor to be synchronized with the sampling frequency of the phase current sampled via the DC stage resistance device. Accordingly, it is possible to accurately calculate the phase current flowing through the motor by means of the DC stage resistance device.

10 Claims, 13 Drawing Sheets

(51) Int. Cl.
    *H02P 21/22* (2016.01)
    *H02P 21/24* (2016.01)
    *H02P 21/00* (2016.01)
    *H02P 27/08* (2006.01)
    *H02P 27/06* (2006.01)
    *H02P 21/14* (2016.01)

(52) U.S. Cl.
    CPC ........ *A47L 9/2868* (2013.01); *H02P 21/0085* (2013.01); *H02P 21/14* (2013.01); *H02P 21/18* (2016.02); *H02P 21/22* (2016.02); *H02P 21/24* (2016.02); *H02P 27/06* (2013.01); *H02P 27/085* (2013.01)

(56) References Cited

U.S. PATENT DOCUMENTS

| 2009/0102412 | A1* | 4/2009 | Hwang | H02P 1/30 318/707 |
| 2011/0260664 | A1* | 10/2011 | Kim | H02P 23/0077 318/400.14 |
| 2012/0217915 | A1 | 8/2012 | Wu et al. | |
| 2014/0239861 | A1 | 8/2014 | Ajima et al. | |
| 2014/0265986 | A1* | 9/2014 | Gebregergis | H02P 23/00 318/494 |
| 2015/0077025 | A1 | 3/2015 | Suzuki | |

FOREIGN PATENT DOCUMENTS

| JP | 2010148301 | | 7/2010 |
| JP | 2015133911 | | 7/2015 |
| KR | 1020140090470 A | * | 7/2014 |

* cited by examiner

MOTOR DRIVING APPARATUS AND HOME APPLIANCE COMPRISING SAME

CROSS-REFERENCE TO RELATED APPLICATIONS

This application is a National Stage application under 35 U.S.C. § 371 of International Application No. PCT/KR2016/011250, filed Oct. 7, 2016, which claims the benefit of Korean Application No. 10-2015-0140813, filed on Oct. 7, 2015. The disclosures of the prior applications are incorporated by reference in their entirety.

TECHNICAL FIELD

The present invention relates to a motor driving apparatus and a home appliance including the same and, more particularly, to a motor driving apparatus capable of precisely calculating a phase current flowing into a motor using a dc stage resistance element and a home appliance including the same.

BACKGROUND ART

A motor driving apparatus is an apparatus for driving a motor including a rotor performing a rotary motion and a stator on which a coil is wound.

Meanwhile, the motor driving apparatus may be divided into a motor driving apparatus of a sensor method using a sensor and a motor driving apparatus of a sensorless method not having a sensor.

Recently, the motor driving apparatus of the sensorless method is widely used due to a reason, such as a manufacturing cost reduction. Accordingly, research is carried out on the motor driving apparatus of the sensorless method for efficient motor driving.

DISCLOSURE

Technical Problem

An object of the present invention is to provide a motor driving apparatus capable of precisely calculating a phase current flowing into a motor using a dc stage resistance element and a home appliance including the same.

Technical Solution

A motor driving apparatus according to an embodiment of the present invention for accomplishing the object includes an inverter converting DC power of a dc stage capacitor into AC power by a switching operation and outputting the converted AC power to a motor, a dc stage resistance element disposed between the dc stage capacitor and the inverter, and a control unit controlling the inverter based on a phase current sampled through the dc stage resistance element, wherein the control unit controls the frequency of a voltage applied to the motor or the rotating frequency of the motor and the sampling frequency of the phase current sampled through the dc stage resistance element so that the frequency of the voltage or the rotating frequency of the motor and the sampling frequency of the phase current are synchronized.

Furthermore, a motor driving apparatus according to another embodiment of the present invention for accomplishing the object includes an inverter converting DC power of a dc stage capacitor into AC power by a switching operation and outputting the converted AC power to a motor, a dc stage resistance element disposed between the dc stage capacitor and the inverter, and a control unit controlling the inverter based on a phase current sampled through the dc stage resistance element, wherein the control unit controls the frequency of a voltage applied to the motor or the rotating frequency of the motor and the sampling frequency of the inverter so that the frequency of the voltage or the rotating frequency of the motor and the switching frequency of the inverter are identical.

Furthermore, a home appliance according to an embodiment of the present invention for accomplishing the object includes an inverter converting DC power of a dc stage capacitor into AC power by a switching operation and outputting the converted AC power to a motor, a dc stage resistance element disposed between the dc stage capacitor and the inverter, and a control unit controlling the inverter based on a phase current sampled through the dc stage resistance element, wherein the control unit controls the frequency of a voltage applied to the motor or the rotating frequency of the motor and the sampling frequency of the phase current sampled through the dc stage resistance element so that the frequency of the voltage or the rotating frequency of the motor and the sampling frequency of the phase current are synchronized.

Furthermore, a home appliance according to another embodiment of the present invention for accomplishing the object includes an inverter converting DC power of a dc stage capacitor into AC power by a switching operation and outputting the converted AC power to a motor, a dc stage resistance element disposed between the dc stage capacitor and the inverter, and a control unit controlling the inverter based on a phase current sampled through the dc stage resistance element, wherein the control unit controls the frequency of a voltage applied to the motor or the rotating frequency of the motor and the sampling frequency of the inverter so that the frequency of the voltage or the rotating frequency of the motor and the switching frequency of the inverter are identical.

Advantageous Effects

In accordance with an embodiment of the present invention, in the motor driving apparatus and the home appliance including the same, the motor driving apparatus includes an inverter converting DC power of a dc stage capacitor into AC power by a switching operation and outputting the converted AC power to a motor, a dc stage resistance element disposed between the dc stage capacitor and the inverter, and a control unit controlling the inverter based on a phase current sampled through the dc stage resistance element, wherein the control unit controls the frequency of a voltage applied to the motor or the rotating frequency of the motor and the sampling frequency of the phase current sampled through the dc stage resistance element so that the frequency of the voltage or the rotating frequency of the motor and the sampling frequency of the phase current are synchronized. Accordingly, a phase current flowing into the motor can be precisely calculated using the dc stage resistance element.

In particular, the motor can be stably driven even when the motor is driven at a high speed because the frequency of a voltage applied to the motor, the rotating frequency of the motor, and the switching frequency of the inverter are controlled so that they are the same. Furthermore, a phase current flowing into the motor can be precisely calculated using the c stage resistance element.

Meanwhile, a transient response characteristic of the motor can be improved by controlling the inverter using an instantaneous torque control method.

Meanwhile, more accurate motor control is made possible because at least one of the sampling value and sampling time of a sampled phase current is compensated for and a switching control signal for control of the inverter is output based on a compensated sampling value or sampling time.

BEST MODE

Hereinafter, the present invention is described in more detail with reference to the drawings.

The suffixes "module" and "unit" of elements used in the following description are assigned by taking into consideration simply the ease of writing this specification, but in themselves are not particularly given important meanings or roles. Accordingly, the "module" and "unit" may be interchangeably used.

A motor driving apparatus described in this specification is a motor driving apparatus not equipped with a location sensing unit, such as a hall sensor sensing the location of the rotor of a motor, and capable of estimating the location of the rotor of the motor using a sensorless method. Hereinafter, the motor driving apparatus of the sensorless method is described.

Meanwhile, a motor driving apparatus 220 according to an embodiment of the present invention may be named a motor driving unit.

Figure 1:
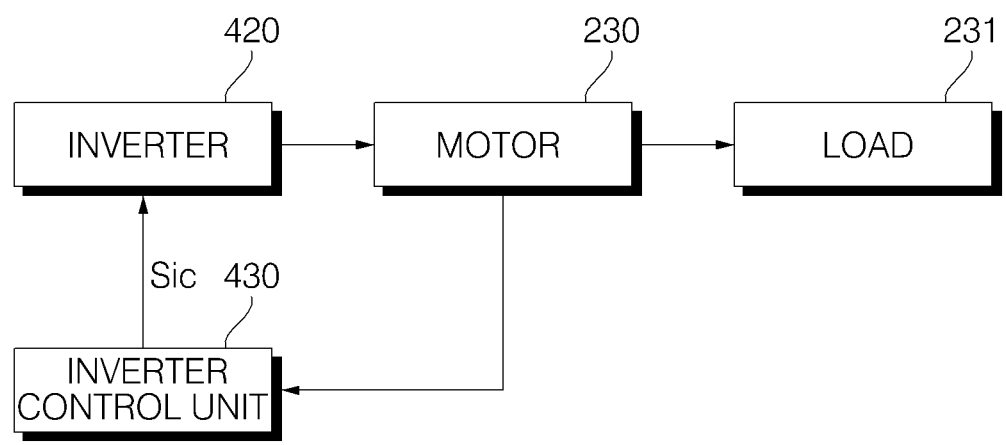
FIG. 1 illustrates an example of an internal block diagram of a motor driving apparatus according to an embodiment of the present invention.
Figure 2:
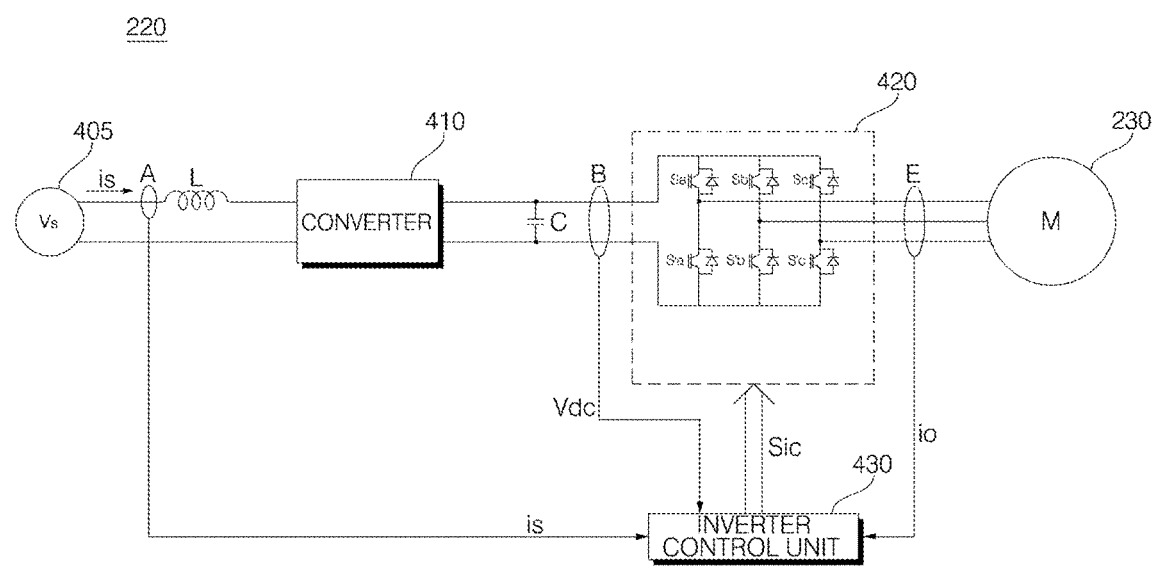
FIG. 2 is an example of an internal circuit diagram of the motor driving apparatus of FIG. 1.

FIG. 1 illustrates an example of an internal block diagram of the motor driving apparatus according to an embodiment of the present invention. FIG. 2 is an example of an internal circuit diagram of the motor driving apparatus of FIG. 1.

Referring to the drawings, the motor driving apparatus 220 according to an embodiment of the present invention is for driving a motor using the sensorless method, and may include an inverter 420 and an inverter control unit 430.

Furthermore, the motor driving apparatus 220 according to an embodiment of the present invention may include a converter 410, a dc stage voltage detector B, a smoothing capacitor C, and an output current detector E. Furthermore, the driving unit 220 may further include an input current detector A, a reactor L and so on.

The motor driving apparatus 220 according to an embodiment of the present invention detects a phase current using one dc stage resistance element disposed between a dc stage capacitor and the inverter. The inverter control unit 430 estimates a phase current based on a phase current sampled through the dc stage resistance element in the section in which phase current detection is impossible. Accordingly, a phase current flowing into a motor can be precisely calculated using the dc stage resistance element.

Meanwhile, there are advantages in that a manufacturing cost is reduced and installation is easy because a phase current is detected in a time division manner using one dc stage resistance element.

In accordance with an embodiment of the present invention, the inverter control unit 430 may control the inverter 420 based on a phase current sampled through the dc stage resistance element Rs, and may control the frequency of a voltage applied to the motor 230 or the rotating frequency of the motor 230 and the sampling frequency of a phase current sampled through the dc stage resistance element Rs so that they are synchronized. An accurate phase current can be measured through such synchronization. Accordingly, the accuracy of motor control can be improved.

Meanwhile, the inverter control unit 430 may control a sampling frequency so that the sampling frequency varies when a phase current is detected if the frequency of a voltage applied to the motor 230 or the rotating frequency of the motor 230 varies.

Meanwhile, the inverter control unit 430 may control a sampling frequency so that the sampling frequency becomes a positive number times the frequency of a voltage applied to the motor or the rotating frequency of the motor. A more accurate phase current can be detected because the sampling frequency is synchronized with the frequency of a voltage applied to the motor or the rotating frequency of the motor and becomes a positive number times the frequency of a voltage applied to the motor or the rotating frequency of the motor.

Meanwhile, the inverter control unit 430 may control the frequency of a voltage applied to the motor or the rotating frequency of the motor and the switching frequency of the inverter 420 so that they become the same. That is, the inverter control unit 430 may control the inverter 420 using a one-pulse driving method. Accordingly, the motor 230 rotating at a high speed of approximately several thousands of rpm or more can be stably driven compared to a pulse width-variable method.

Meanwhile, the inverter control unit 430 may control the inverter 420 using an instantaneous torque control method. Accordingly, transient response performance of the motor 230 can be improved compared to an average torque control method.

Meanwhile, the inverter control unit 430 may compensate for at least one of the sampling value and sampling time of a sampled phase current, and may output a switching control signal for controlling the inverter 420 based on the compensated sampling value or sampling time. Accordingly, the motor 230 can be driven more precisely.

Hereinafter, the operation of each of elements within the motor driving apparatus 220 of FIGS. 1 and 2 is described.

The reactor L is disposed between a commercial AC power 405 $v_s$ and the converter 410, and performs power factor correction or a step-up operation. Furthermore, the reactor L may perform a function for limiting a high frequency current attributable to the high-speed switching of the converter 410.

The input current detector A may detect an input current $i_s$ received from the commercial AC power 405. To this end, a current transformer (CT), a shunt resistor or the like may be used as the input current detector A. The detected input current $i_s$ may be input to the inverter control unit 430 as a discrete signal of a pulse form.

The converter 410 converts the commercial AC power 405 via the reactor L into DC power, and outputs the DC power. In the drawing, the commercial AC power 405 has been illustrated as being single-phase AC power, but may be 3-phase AC power. The internal structure of the converter 410 is different depending on the type of commercial AC power 405.

Meanwhile, the converter 410 includes a diode, etc. without a switching element and may perform a rectification operation without a separate switching operation.

For example, four diodes of a bridge form may be used in the case of single-phase AC power, and six diodes of a bridge form may be used in the case of 3-phase AC power.

Meanwhile, for example, a converter of a half bridge form to which two switching elements and four diodes are connected may be used as the converter 410. In the case of 3-phase AC power, six switching elements and six diodes may be used.

If the converter 410 includes a switching element, a step-up operation, power factor improvement and DC power conversion may be performed by the switching operation of the corresponding switching element.

The smoothing capacitor C smoothes input power and stores the power. In the drawing, the smoothing capacitor C is illustrated as being one element, but a plurality of the elements may be provided to secure device stability.

Meanwhile, in the drawing, the smoothing capacitor C is illustrated as being connected to the output terminal of the converter 410, but is not limited thereto. DC power may be directly input to the smoothing capacitor C. For example, DC power from a solar cell may be directly input to the smoothing capacitor C or may be DC/DC converted and input to the smoothing capacitor C. Hereinafter, a portion illustrated in the drawing is chiefly described.

Meanwhile, DC power is stored at both ends of the smoothing capacitor C, and thus both ends may be called a dc stage or a dc link stage.

The dc stage voltage detector B may detect a dc stage voltage Vdc at both ends of the smoothing capacitor C. To this end, the dc stage voltage detector B may include a resistance element, an amplifier and so on. The detected dc stage voltage Vdc is a discrete signal of a pulse form, and may be input to the inverter control unit 430.

The inverter 420 includes a plurality of inverter switching elements, and may convert the DC power Vdc, smoothed by the on/off operation of the switching elements, into 3-phase AC power va, vb, and vc of a specific frequency and output them to the 3-phase synchronization motor 230.

The inverter 420 has a total of three pairs of upper and lower arm switching elements connected in parallel (Sa&S'a, Sb&S'b, and Sc&S'c). Each of the upper arm switching elements Sa, Sb, and Sc and each of the lower arm switching elements S'a, S'b, and S'c form a pair. Diodes are connected to the respective switching elements Sa, S'a, Sb, S'b, Sc, and S'c in reverse-parallel.

The switching elements of the inverter 420 performs the on/off operation of each of the switching elements based on an inverter switching control signal Sic from the inverter control unit 430. Accordingly, 3-phase AC power having a specific frequency is output to the 3-phase synchronization motor 230.

The inverter control unit 430 may control the switching operation of the inverter 420 based on the sensorless method. To this end, the inverter control unit 430 may receive an output current idc detected by the output current detector E.

In order to control the switching operation of the inverter 420, the inverter control unit 430 outputs the inverter switching control signal Sic to the inverter 420. The inverter switching control signal Sic is generated as a switching control signal of a one-pulse method based on the output current idc detected by the output current detector E. A detailed operation of the inverter switching control signal Sic of the inverter control unit 430 is described with reference to FIG. 3.

The output current detector E may detect the output current idc flowing into the 3-phase motor 230.

The output current detector E is disposed between the dc stage capacitor C and the inverter 420 and may detect a phase current flowing into the motor.

In particular, the output current detector E may include one shunt resistor element Rs.

Meanwhile, the output current detector E may detect a phase current phase current, that is, the output current idc flowing into the motor 230, using the one shunt resistor element Rs in a time division manner when the lower arm switching elements of the inverter 420 are turned.

The detected output current idc may be applied to the inverter control unit 430 as a discrete signal of a pulse form. The inverter switching control signal Sic is generated based on the detected output current idc. Hereinafter, the detected output current idc is illustrated as being a 3-phase output current (ia, ib, ic).

Meanwhile, the 3-phase motor 230 includes a stator and a rotor. Each phase AC power of a specific frequency is applied to the coil of the stator of each of the phases a, b, and c, so the rotor is rotated.

The motor 230 may include, for example, a surface-mounted permanent-magnet synchronous motor (SMPMSM), an interider permanent magnet synchronous motor (IPMSM), and a synchronous reluctance motor (Synrm). The SMPMSM and the IPMSM correspond to a permanent magnet synchronous motor (PMSM), and the Synrm does not have a permanent magnet.

Figure 3:
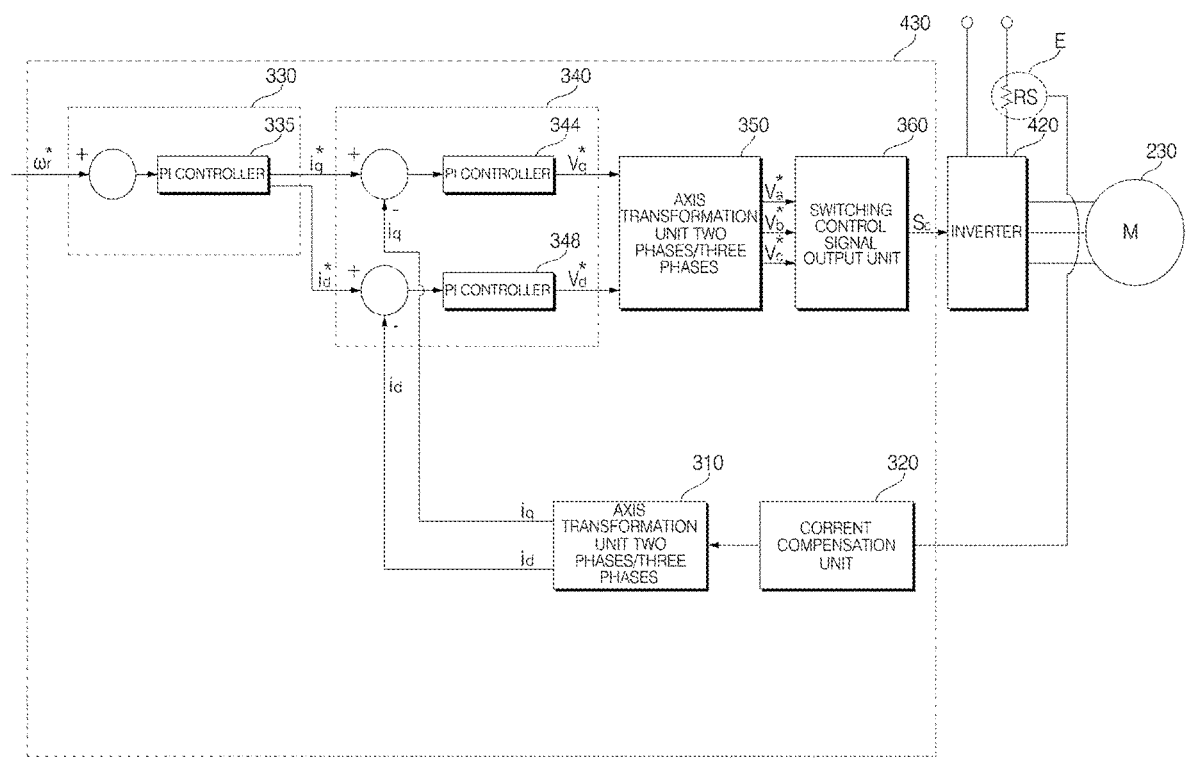
FIG. 3 is an internal block diagram of an inverter control unit of FIG. 2.

FIG. 3 is an internal block diagram of the inverter control unit of FIG. 2.

Referring to FIG. 3, the inverter control unit 430 may include an axis transform unit 310, a current compensation unit 320, a current instruction generation unit 330, a voltage instruction generation unit 340, an axis transform unit 350, and a switching control signal output unit 360.

The current compensation unit 320 may compensate for at least one of the sampling value and sampling time of the phase current Idc detected by the output current detector E.

To this end, the current compensation unit 320 may include a first compensation unit 320a compensating for the sampling time of a sampled phase current and a second compensation unit 320b compensating for the sampling value of a sampled phase current. More accurate motor control is made possible by such current compensation.

The axis transform unit 310 may transform each phase current idc, compensated for by the current compensation unit 320, into a 2-phase current iα, iβ of stationary coordinates.

Meanwhile, the axis transform unit 310 may transform the 2-phase current iα, iβ of a stationary coordinate system into a 2-phase current id, iq of a rotating coordinate system.

Meanwhile, the current instruction generation unit 330 may generate a current instruction value $i^*_q$ based on a torque instruction value T*. For example, the current instruction generation unit 330 may perform PI control through a PI controller 335 based on the torque instruction value T*, and may generate the current instruction value $i^*_q$. In the drawing, the q-axis current instruction value $i^*_q$ is illustrated as being the current instruction value, but the current instruction generation unit 330 may also generate a d-axis current instruction value $i^*_d$. Meanwhile, the value of the d-axis current instruction value $i^*_d$ may be set to 0.

Meanwhile, the current instruction generation unit 330 may further include a limiter (not shown) that limits the level of the current instruction value $i^*_q$ so that it does not exceed a permissible range.

The voltage instruction generation unit 340 generates d-axis and q-axis voltage instruction values $v^*_d$ and $v^*_q$ based on d-axis and q-axis currents $i_d$ and $i_q$ axially transform into 2-phase rotating coordinates by the axis transform unit and the current instruction values $i^*_d$ and $i^*_q$ of the current instruction generation unit 330. For example, the voltage instruction generation unit 340 may perform PI control through a PI controller 344 based on a difference between the q-axis current $i_q$ and the q-axis current instruction value $i^*_q$, and may generate a q-axis voltage instruction value $v^*_q$. Furthermore, the voltage instruction generation unit 340 may perform PI control through the PI controller 348 based on a difference between the d-axis current $i_d$ and the d-axis current instruction value $i^*_d$, and may generate a d-axis voltage instruction value $v^*_d$. Meanwhile, the voltage instruction generation unit 340 may further include limiter (not shown) that limits the level of the d-axis, q-axis voltage instruction value $v^*_d$, $v^*_q$ so that it does not exceed a permissible range.

Meanwhile, the generated d-axis and q-axis voltage instruction values $v^*_d$ and $v^*_q$ are input to the axis transform unit 350.

The axis transform unit 350 may receive the d-axis and q-axis voltage instruction values $v^*_d$ and $v^*_q$ from the speed calculation unit 320, and may perform axis transform.

First, the axis transform unit 350 performs transform from a 2-phase rotating coordinate system to a 2-phase stationary coordinate system.

Furthermore, the axis transform unit 350 performs transform from a 2-phase stationary coordinate system to a 3-phase stationary coordinate system. The axis transform unit 1050 may output 3-phase output voltage instruction values v*a, v*b, and v*c through such transform.

The switching control signal output unit 360 may generate and output the switching control signal Sic for the inverter according to the one-pulse method based on the 3-phase output voltage instruction values v*a, v*b, and v*c.

The output inverter switching control signal Sic may be converted into a gate driving signal by a gate driving unit (not shown) and may be input to the gate of each switching element within the inverter 420. Accordingly, each of the switching elements Sa, S'a, Sb, and S'b, Sc, S'c of the inverter 420 performs a switching operation.

Meanwhile, it is essential for the motor driving apparatus 100 to detect the output current idc flowing into the motor 230, in particular, a phase current in order to perform vector control of driving the motor 230 through control of the inverter 420 as described above.

The inverter control unit 430 can control the motor 230 at a desired speed and torque using the current instruction generation unit 330 and the voltage instruction generation unit 340 based on a detected phase current.

Figure 4:
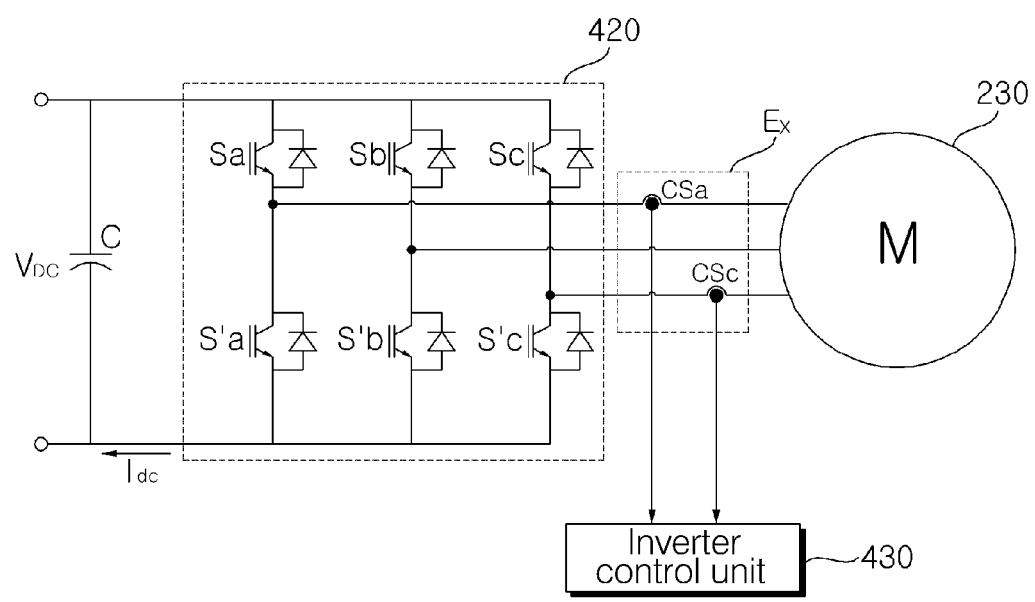
FIG. 4 is a diagram illustrating an example of an output current detector of FIG. 2.

FIG. 4 is a diagram illustrating an example of the output current detector of FIG. 2.

The drawing illustrates that the output current detector Ex of FIG. 4 includes two current sensors CSa and CSc in order to sense the a phase current and c phase current of a 3-phase current (a, b and c phase currents) flowing into the motor 230.

Meanwhile, the b phase current may be calculated using a condition in which the sum of the 3-phase currents is 0.

Figure 5:
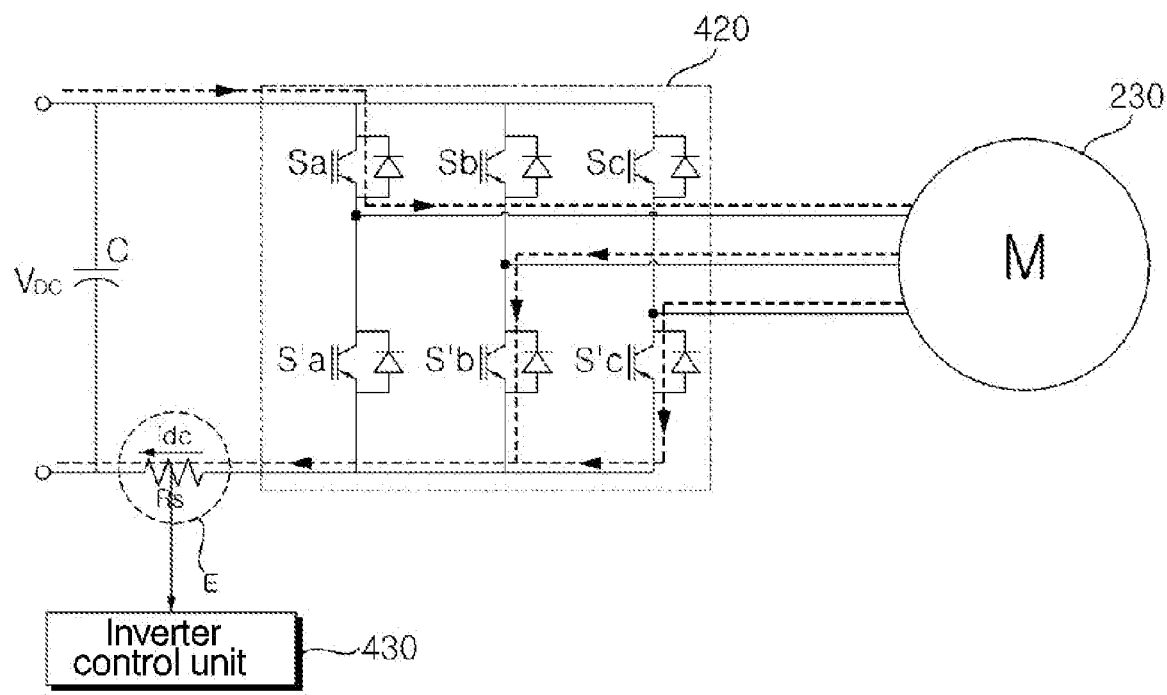
FIG. 5 is a diagram illustrating an example of the output current detector of the motor driving apparatus according to an embodiment of the present invention.

Meanwhile, a method of sensing a motor current using a single dc stage resistance element as in FIG. 5 has advantages in that a manufacturing cost is reduced and installation is easy compared to the method of FIG. 4.

Accordingly, in the present invention, a method of sensing a motor current using 1 shunt resistance element, such as FIG. 5, is chiefly described.

FIG. 5 is a diagram illustrating an example of the output current detector of the motor driving apparatus according to an embodiment of the present invention.

Referring to the drawing, the output current detector E may include a dc stage resistance element Rs disposed between the dc stage capacitor C and the inverter 420.

The inverter control unit 430 may calculate a current flowing into the motor 230 based on a current flowing into the dc stage resistance element Rs, and may control the inverter 420 based on the calculated motor current.

As in the drawing, a method of obtaining a current using the dc stage resistance element Rs is called a shunt algorithm.

The shunt algorithm is divided into a 1-shunt, a 2-shunt and a 3-shunt depending on the location and number of shunt resistor elements. In the present invention, the 1-shunt method is described.

In accordance with the 1-shunt method, the 3-phase current (a, b, c) phase current flowing into the motor 230 is obtained by only a single shunt resistance element disposed at the dc stage.

Accordingly, a current sensor can be reduced compared to FIG. 4 and peripheral circuits, such as a voltage amplifier and an A/D port, can be reduced compared to the 2-shunt or 3-shunt method. Furthermore, there are many advantages in that the manufacturing cost and volume of the motor driving apparatus 220 are reduced.

The motor driving apparatus 220 according to an embodiment of the present invention detects a phase current using the single dc stage resistance element disposed between the dc stage capacitor and the inverter. In particular, a phase current can be precisely calculated because the phase current is detected in a time division manner. Furthermore, a manufacturing cost is reduced and installation is easy.

FIGS. 6a to 10 are diagrams to which reference is made for a description of the operation of the motor driving apparatus of FIG. 1.

Figure 6A:
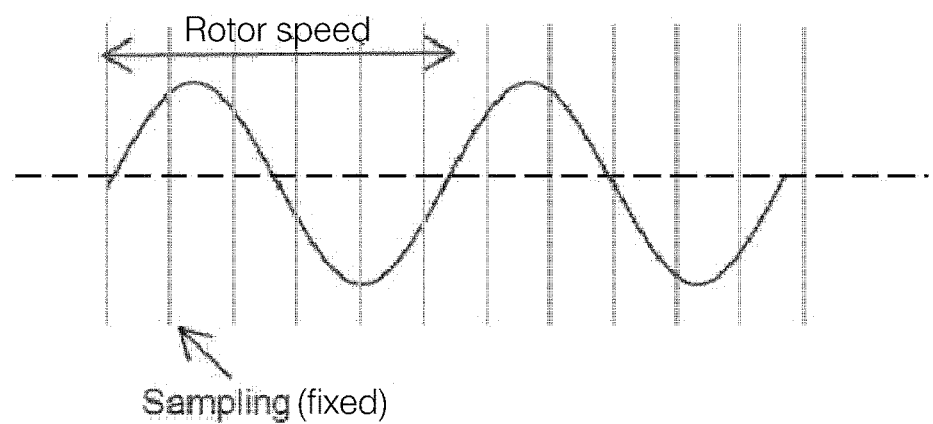
FIGS. 6a to 10 are diagrams to which reference is made for a description of the operation of the motor driving apparatus of FIG. 1.

First, FIG. 6a illustrates a case where the rotor speed of the motor 230 and a sampling time when a phase current through the dc stage resistance element Rs is detected are not synchronized.

An error is generated in an output voltage applied to the motor 230 because the inverter control unit 430 performs control based on an inaccurate phase current. Accordingly, the torque ripple of the motor 230 is increased.

Figure 6B:
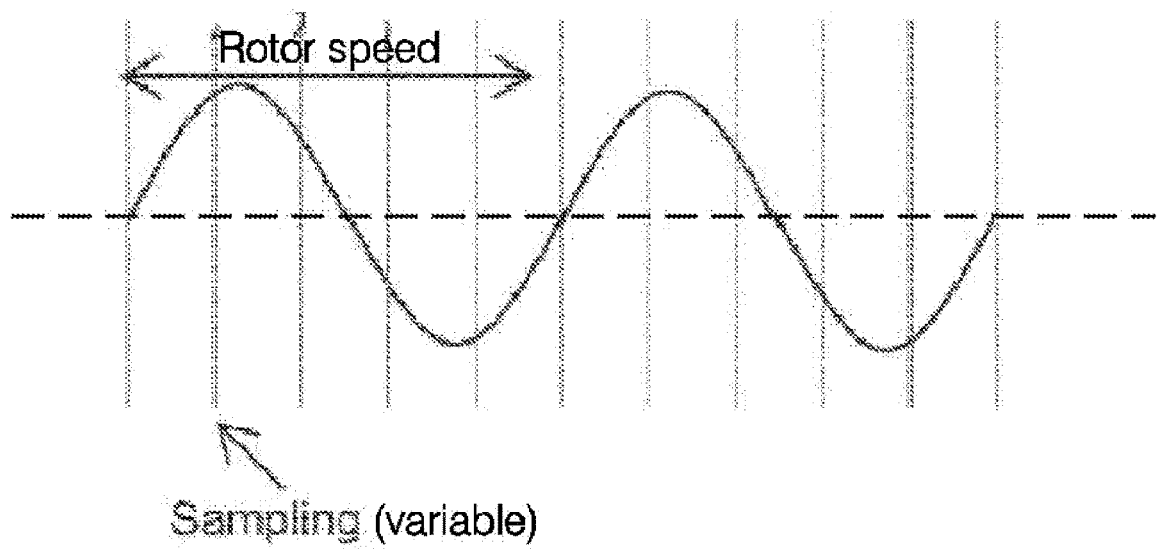

FIG. 6b illustrates a case where the rotor speed of the motor 230 and a sampling time when a phase current through the dc stage resistance element Rs is detected are synchronized.

This drawing illustrates that a sampling frequency when a phase current is detected is six times the frequency of a voltage applied to the motor 230 or the rotating frequency of the motor 230.

As described above, the frequency of a voltage applied to the motor 230 or the rotating frequency of the motor 230 and the sampling frequency of a phase current sampled through the dc stage resistance element Rs are synchronized, and the inverter control unit 430 performs control based on a detected phase current. Accordingly, an error in an output voltage applied to the motor 230 is minimized, and thus the torque ripple of the motor 230 is significantly reduced.

Figure 7:
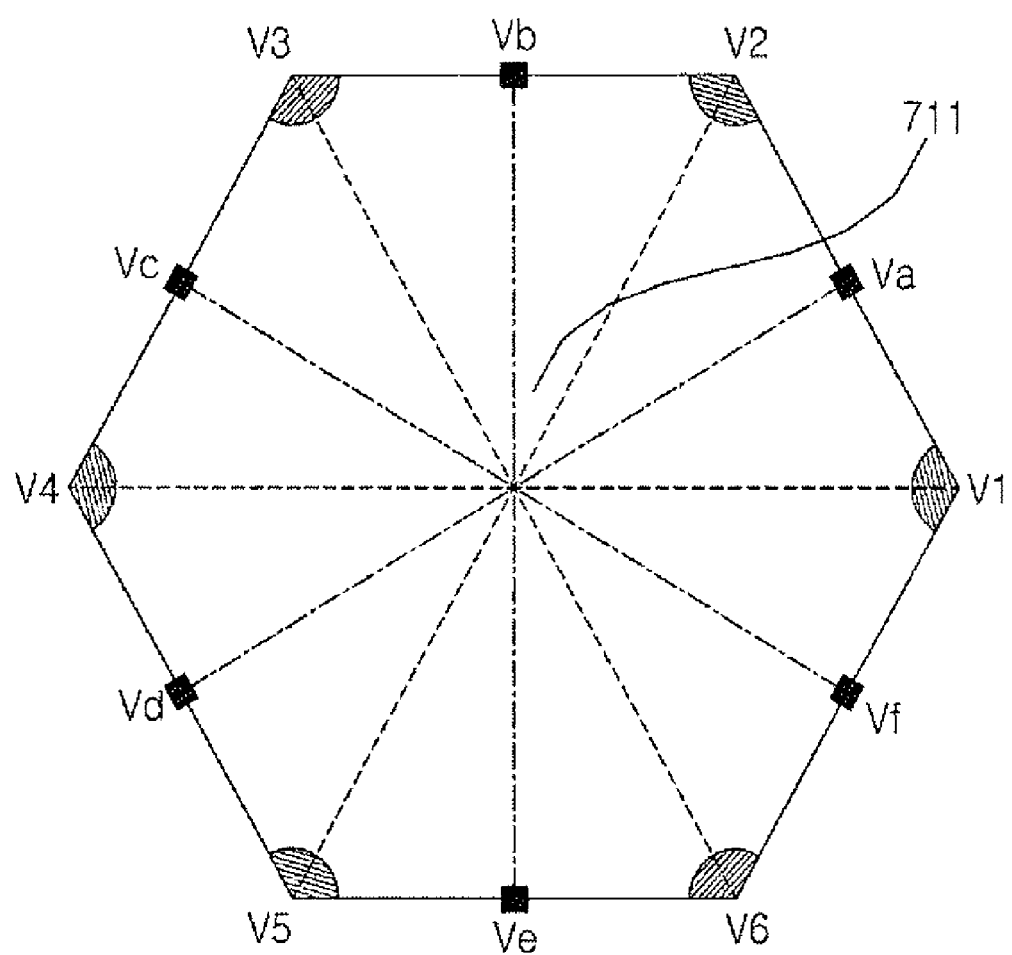

FIG. 7 is a diagram showing regions where a phase current may be detected using the one dc stage resistance element Rs based on a spatial voltage vector.

Referring to the drawing, a phase current may be detected using the one dc stage resistance element Rs in a region 711 other than deviant crease line regions, that is, regions around V1, V2, V3, V3, V4, V5, and V6.

Meanwhile, the drawing illustrates that phase currents may be detected using the one dc stage resistance element Rs in accordance with Va, Vb, Vc, Vd, Ve, and Vf vectors in order to detect the phase current.

Figure 8:
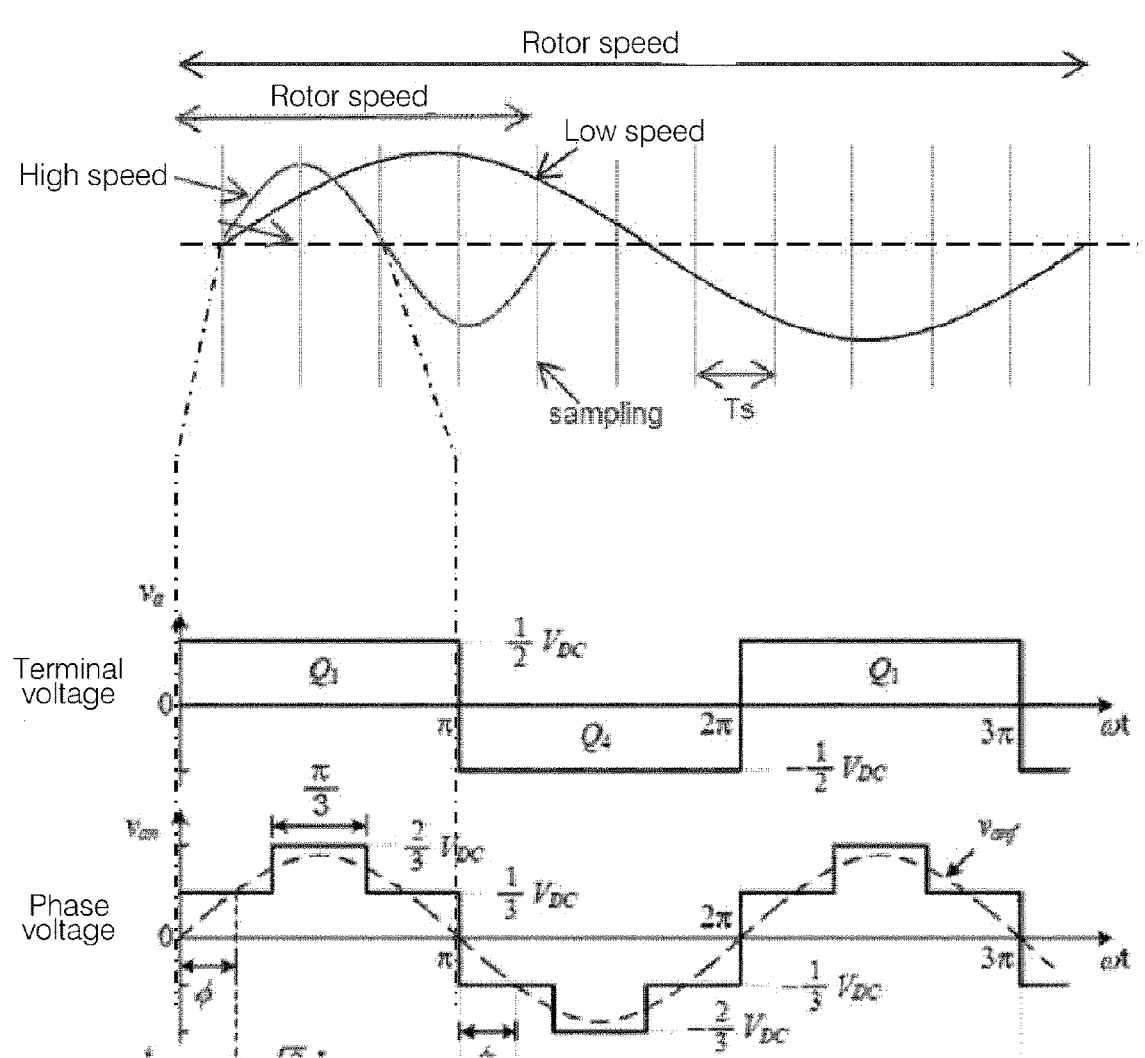

FIG. 8 is a diagram to which reference is made to describe the one pulse driving method.

If the rotation speed of the motor 230 is several thousands of rpm or more as described above, a counter electromotive force generated in the motor 230 may increase according to a pulse width modulation (PWM) method.

Furthermore, as the rotation speed of the motor 230 increases, the switching frequency of the inverter 420 also needs to increase. However, the PWM method is not suitable for high-speed driving because the switching frequency has an upper limit.

Accordingly, in the present invention, the inverter 420 is controlled according to the one-pulse driving method.

That is, the inverter control unit 430 may control the frequency of a voltage applied to the motor or the rotating frequency of the motor and the switching frequency of the inverter 420 so that they are the same.

The drawing illustrates that when the motor 230 rotates at a high speed, the terminal voltage frequency and phase voltage frequency of the motor 230 are the same in accordance with the rotating frequency of the motor 230.

As described above, when the motor 230 is rotated once, one pulse is applied, which is called a 1-pulse method.

Meanwhile, the drawing illustrates that when the motor 230 is rotated once, a phase current is sampled four times when it is detected, but the above synchronization is sufficient.

Figure 9:
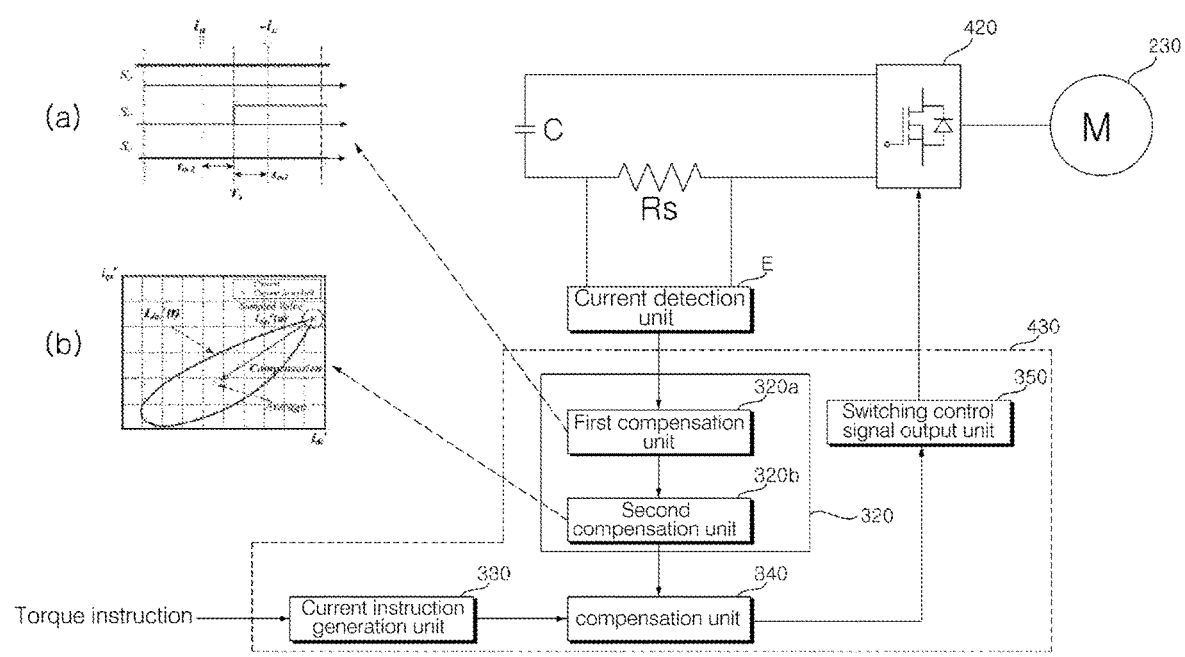

FIG. 9 is a diagram illustrating a compensation method for a detected phase current.

Referring to the drawing, the inverter control unit 430 may include a current compensation unit 320, a current instruction generation unit 330, a voltage instruction generation unit 340, and a switching control signal output unit 360.

The current compensation unit 320 may include a first compensation unit 320a compensating for the sampling time of a sampled phase current and a second compensation unit 320b compensating for the sampling value of a sampled phase current.

A sampling time error may occur by sampling a phase current at Ts+tm1 and Ts−tm2, that is, points on both sides of a switching point Ts, in order to measure two phase currents as in FIG. 9(a). That is, the sampling time error may occur because three phase currents are not measured at the same time.

The first compensation unit 320a may compensate for such a sampling time.

In a sampling value error, the instantaneous output voltage vector of the inverter 420 may look rotating π/3 clockwise on an actual d-q rotor reference coordinate system during π/3 in which the output voltage Vdqss of the inverter 420 is maintained as in FIG. 9(b).

A current value sampled at a switching point may be a peak value not an average value of a pulsating current. It is necessary to compensate a measured peak current based on an average value.

That is, the second compensation unit 320b may compensate for a sampling current error attributable to a d-q-axis current that pulsates between points Ts.

Figure 10:
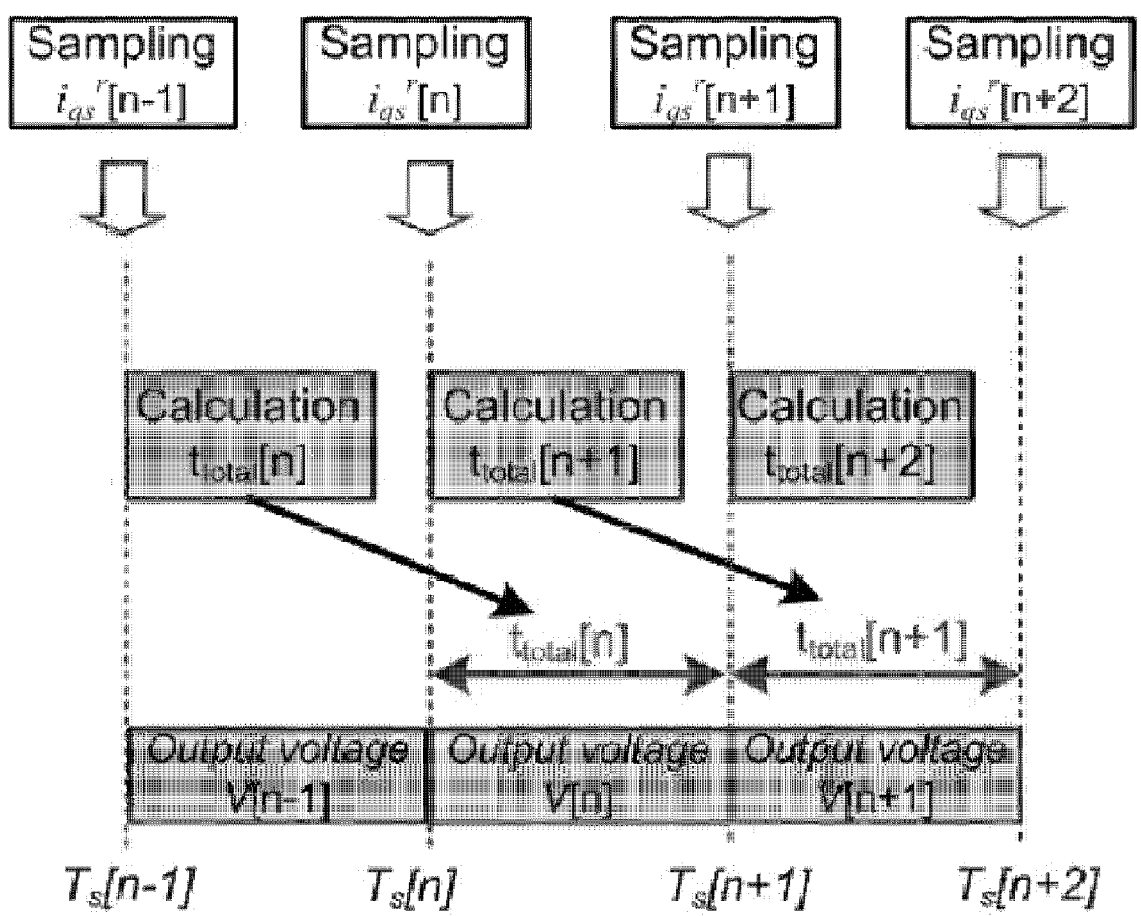

FIG. 10 is a diagram to which reference is made to describe instantaneous torque control.

Referring to the drawing, the inverter control unit 430 may generate the inverter switching control signal Sic in response to the generation of a current instruction and voltage instruction within FIG. 3 based on a sampled phase current every sampling timing Ts(n−1), Ts(n), Ts(n+1), Ts(n+2), and may perform control so that the generated inverter switching control signal Sic is incorporated in a next control cycle.

Accordingly, the inverter control unit 430 can perform instantaneous torque control. Accordingly, a transient response characteristic of the motor 230 can be improved.

Figure 11:
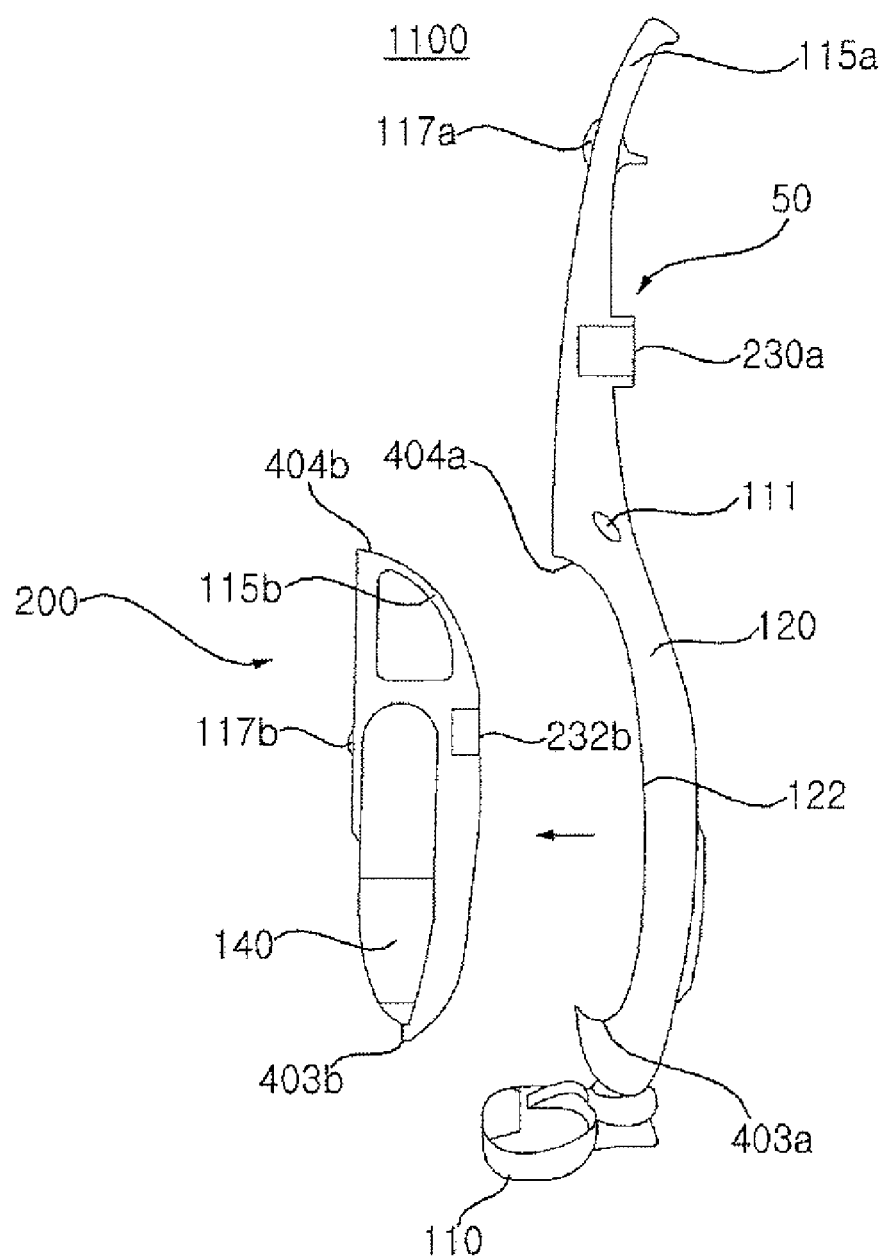
FIG. 11 is a perspective view showing a cleaner, that is, an example of a home appliance according to an embodiment of the present invention.
Figure 12:
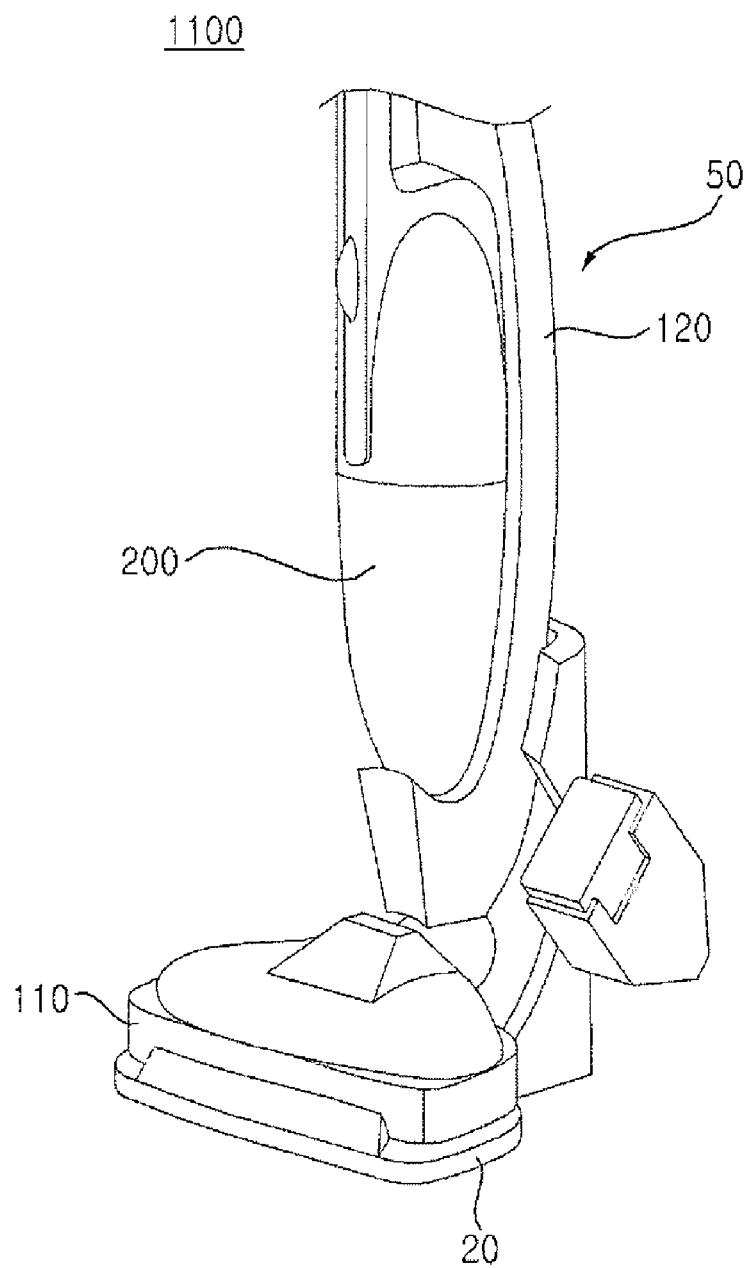
FIG. 12 is a diagram showing that a second cleaner has been attached to the first cleaner of FIG. 11.

FIG. 11 is a perspective view showing a cleaner, that is, an example of a home appliance according to an embodiment of the present invention. FIG. 12 is a diagram showing that a second cleaner has been attached to the first cleaner of FIG. 11.

Referring to the drawings, the cleaner 1100 related to the present invention is a cordless separation type cleaner.

Accordingly, the cordless separation type cleaner 1100 may include a second cleaner 200 detachable from a first cleaner 50.

The first cleaner 50 may include a main body 120, a first battery 230a detachable from the main body 120, and a first motor 142a that rotates using first DC power from the first battery 230a in order to generate a suction force. Meanwhile, the first cleaner 50 may be a stick type cleaner.

The second cleaner 200 may include coupling units 403b and 404b attached to seating units 403a and 404a formed in the main body 120 of the first cleaner 50, a second battery 230b, and a second motor 142b that rotates using second DC power from the second battery 230b in order to generate a suction force. Meanwhile, the second cleaner 200 may be a handy type cleaner.

The first cleaner 50 may further include a first handle 115a formed at the top of the main body 120 and a first input unit 117a formed near the first handle 115a.

Meanwhile, a fan (not shown), a fan motor (142a of FIG. 13), and a fan driving unit (not shown) that drives the fan may be included within the first cleaner 50. A suction force may be generated by the rotation of the fan (not shown).

A generated suction force is delivered to an intake port 110 formed at the bottom of the main body 120.

Accordingly, the vacuum cleaner 1100, in particular, the first cleaner 50 can suck a foreign substance around the intake port 110. The sucked alien substance may be stored in a dust canister 140 formed in the second cleaner 200 and detachably attached to the second cleaner 200.

Meanwhile, a filter for filtering out a sucked foreign substance may be further included near the dust canister 140. The dust canister 140 may store a filtered-out foreign substance.

Meanwhile, the coupling units 403*b* and 404*b* of the second cleaner 200 may be coupled to the seating units 403*a* and 404*a* formed in the main body 120 of the first cleaner 50.

The second cleaner 200 may further include a second handle 115*b* formed at the top of a frame and a second input unit 117*b* formed near the second handle 115*b*.

Meanwhile, when the second cleaner 200 is seated in the seating units 403*a* and 404*a* formed in the main body 120 of the first cleaner 50, a manipulation unit 111 formed in the main body 120 of the first cleaner 50 may stick out.

A user may separate the second cleaner 200 seated in the seating units 403*a* and 404*a* formed in the main body 120 of the first cleaner 50 by pressing the manipulation unit 111.

FIG. 12 illustrates that the bottom of the intake port 110 of the cleaner 1100 has been placed on the charger 20 in the state in which the second cleaner 200 has been seated in the seating units 403*a* and 404*a* formed in the main body 120 of the first cleaner 50.

Although not shown in the drawing, a connection unit (not shown) may be formed at the bottom of the intake port 110 so that DC power from a charger 20 may be supplied through a connection unit (not shown).

Meanwhile, the cleaner 1100 of the present invention is a cordless cleaner, and the second cleaner 200 can be separated. The first cleaner 50 and the second cleaner 200 may include the batteries 230*a* and 230*b*, respectively.

In particular, when the second cleaner 200 is mounted on the main body 120 and the first motor (142*a* of FIG. 13) within the first cleaner 50 is rotated, the first motor 142*a* may be rotated by third DC power, that is, the sum of first DC power from the first battery 230*a* and second DC power from the second battery 230*b*.

Accordingly, a suction force of high output using the plurality of batteries can be generated.

In particular, when the second cleaner 200 is separated and solely driven, the second motor (142*b* of FIG. 13) is rotated by the second DC power from the second battery 230*b*. At this time, it is preferred that the suction force of the first motor 142*a* when the second cleaner 200 is mounted is greater than the suction force when the second cleaner 200 is separated and solely driven.

Figure 13:
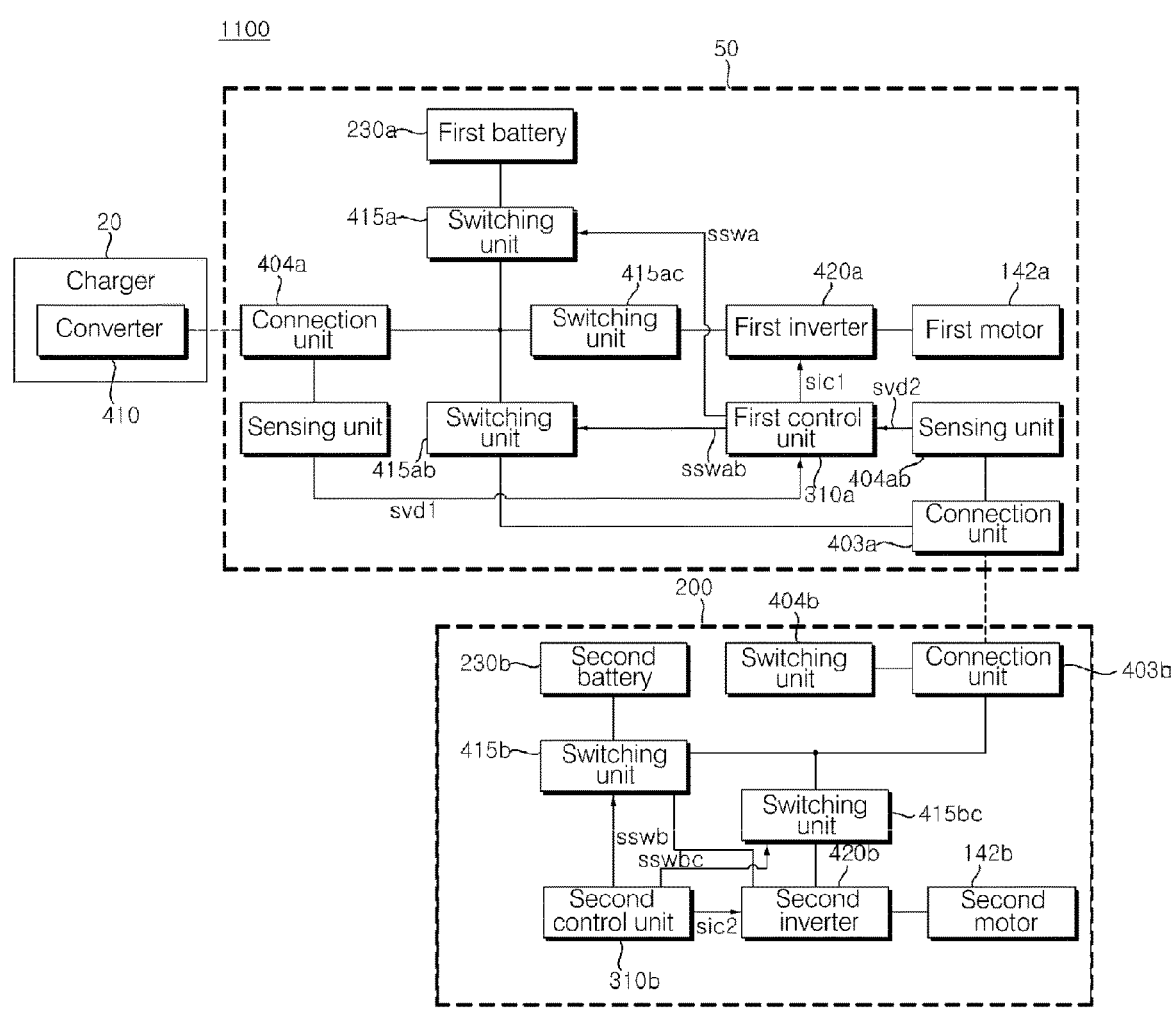
FIG. 13 is a diagram illustrating an internal block diagram of the cleaner of FIG. 11.

FIG. 13 is a diagram illustrating an internal block diagram of the cleaner of FIG. 11.

The cleaner 1100 includes a first cleaner 50 and a second cleaner 200.

The first cleaner 50 may include a first battery 230*a*, a connection unit 404*a* that receives DC power from the converter 410 of a charger 20, a switching unit 415*ac* that switches the received DC power and transfers it to a first inverter 420*a*, and the first inverter 420*a* that converts the DC power from the switching unit 415*ac* into AC power and drives a first motor 142*a*.

Meanwhile, the first cleaner 50 may include a sensing unit that senses whether DC power is received from the connection unit 404*a* or a level of received DC power and a first control unit 310*a* that determines whether the first battery 230*a* needs to be charged based on a sensing signal Svd1 from the sensing unit.

Meanwhile, the first control unit 310*a* may output a control signal sswa to the switching unit 415*a* in order to charge the first battery 230*a*.

Meanwhile, the first control unit 310*a* may output a control signal sswab to a switching unit 415*ab* in order to charge the second battery 230*b*.

Meanwhile, when the second cleaner 200 is mounted, the connection unit 403*a* of the first cleaner 50 and the connection unit 403*b* of the second cleaner 200 may be electrically connected.

Meanwhile, the first control unit 310*a* may receive a sensing signal Svd2 from the sensing unit that senses whether DC power is received through the connection unit 403*a* or a level of DC power when the second cleaner 200 is mounted.

The second cleaner 200 may include a second battery 230*b*, the connection unit 403*b* that receives DC power from the connection unit 403*a* of the first cleaner 50, a switching unit 415*bc* that switches the received DC power and transfers it to a second inverter 420*b*, and the second inverter 420*b* that converts the DC power received from the switching unit 415*bc* into AC power and drives a second motor 142*b*.

Meanwhile, the second cleaner 200 may include a sensing unit 404*b* that senses whether DC power is received through the connection unit 403*b* and a level of DC power and a second control unit 310*b* that controls the second inverter 420*b*.

Meanwhile, the second control unit 310*b* may output a control signal sswb to a switching unit 415*b* in order to charge the second battery 230*b*.

Meanwhile, the motor driven by the motor driving apparatus described in FIGS. 1 to 10 is a motor capable of high-speed rotation, and may be the first motor 142*a* or the second motor 142*b* of FIG. 13.

That is, the motor driving apparatus 220 described in FIGS. 1 to 10 may be a driving apparatus for driving the first motor 142*a* or the second motor 142*b* of FIG. 13.

Meanwhile, in FIGS. 11 to 13, a cleaner has been illustrated as an example of another home appliance according to an embodiment of the present invention, but the present invention is not limited thereto and various examples are possible.

That is, the motor driving apparatus 220 described in FIGS. 1 to 10 may be applied to a washing machine, a refrigerator, an air conditioner, a drone, a robot, an electric vehicle and so on.

The motor driving apparatus and the home appliance including the same according to the embodiments of the present invention are not limited and applied to the configurations and methods of the aforementioned embodiments, but some or all of each of the embodiments may be selectively combined and configured so that the embodiments are modified in various ways Meanwhile, the motor driving method or the operating method of the home appliance of the present invention may be implemented in a recording medium readable by a processor included in the motor driving apparatus or the home appliance in the form of processor-readable code. The processor-readable recording medium includes all types of recording devices in which data readable by the processor is stored.

Furthermore, although the preferred embodiments of the present invention have been illustrated and described above, the present invention is not limited to the aforementioned specific embodiments, and may be modified in various ways by a person having ordinary skill in the art to which the present invention pertains without departing from the gist of the present invention in the claims. Such modified embodi-

The invention claimed is:

1. A motor driving apparatus, comprising:
    an inverter converting DC power of a dc stage capacitor into AC power by a switching operation and outputting the converted AC power to a motor;
    a dc stage resistance element disposed between the dc stage capacitor and the inverter; and
    a control unit controlling the inverter based on a phase current sampled through the dc stage resistance element,
    wherein the control unit controls a frequency of a voltage applied to the motor or a rotating frequency of the motor and a sampling frequency of the phase current sampled through the dc stage resistance element so that the frequency of the voltage or the rotating frequency of the motor and the sampling frequency of the phase current are synchronized,
    wherein the control unit comprises:
        a current compensation unit compensating for the sampled phase current;
        a current instruction generation unit generating a current instruction value based on a torque instruction value;
        a voltage instruction generation unit generating a voltage instruction value based on the current instruction value and the compensated phase current; and
        a switching control signal output unit outputting a switching control signal for driving the inverter based on the voltage instruction value, and
    wherein the current compensation unit comprises:
        a first compensation unit compensating for a sampling time of the sampled phase current; and
        a second compensation unit compensating for a sampling value of the sampled phase current.

2. The motor driving apparatus of claim 1, wherein the control unit controls the sampling frequency so that the sampling frequency varies when the frequency of the voltage applied to the motor or the rotating frequency of the motor varies.

3. The motor driving apparatus of claim 1, wherein the control unit controls the sampling frequency so that the sampling frequency is a positive number times the frequency of the voltage applied to the motor or the rotating frequency of the motor.

4. The motor driving apparatus of claim 1, wherein the control unit controls the frequency of the voltage applied to the motor or the rotating frequency of the motor and a switching frequency of the inverter so that the frequency of the voltage or the rotating frequency of the motor and the sampling frequency of the phase current are identical.

5. The motor driving apparatus of claim 1, wherein the control unit controls the inverter using an instantaneous torque control method.

6. The motor driving apparatus of claim 1, wherein the control unit compensates for at least one of a sampling value and sampling time of the sampled phase current and outputs a switching control signal for control of the inverter based on the compensated sampling value or sampling time.

7. The motor driving apparatus of claim 1, further comprising:
    a converter converting AC power into DC power;
    the dc stage capacitor storing a dc stage voltage which is an output terminal of the converter; and
    a dc stage voltage detector detecting the dc stage voltage.

8. A motor driving apparatus, comprising:
    an inverter converting DC power of a dc stage capacitor into AC power by a switching operation and outputting the converted AC power to a motor;
    a dc stage resistance element disposed between the dc stage capacitor and the inverter; and
    a control unit controlling the inverter based on a phase current sampled through the dc stage resistance element,
    wherein the control unit controls a frequency of a voltage applied to the motor or a rotating frequency of the motor and a sampling frequency of the inverter so that the frequency of the voltage or the rotating frequency of the motor and a switching frequency of the inverter are identical,
    wherein the control unit comprises:
        a current compensation unit compensating for the sampled phase current;
        a current instruction generation unit generating a current instruction value based on a torque instruction value and the compensated phase current;
        a voltage instruction generation unit generating a voltage instruction value based on the current instruction value and the compensated phase current; and
        a switching control signal output unit outputting a switching control signal for driving the inverter based on the voltage instruction value, and
    wherein the current compensation unit comprises:
        a first compensation unit compensating for a sampling time of the sampled phase current; and
        a second compensation unit compensating for a sampling value of the sampled phase current.

9. A home appliance comprising a motor driving apparatus according to claim 1.

10. A home appliance comprising a motor driving apparatus according to claim 8.

* * * * *